United States Patent
Kim et al.

(10) Patent No.: US 12,362,875 B2
(45) Date of Patent: Jul. 15, 2025

(54) DEVICE AND METHOD FOR SUPPORTING COMMUNICATION USING PLURALITY OF BANDWIDTHS IN WIRELESS LOCAL AREA NETWORK SYSTEM

(71) Applicant: SAMSUNG ELECTRONICS CO., LTD., Suwon-si (KR)

(72) Inventors: Myeongjin Kim, Suwon-si (KR); Wookbong Lee, Suwon-si (KR); Jinmin Kim, Suwon-si (KR); Eunsung Jeon, Suwon-si (KR); Chulho Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/375,178

(22) Filed: Sep. 29, 2023

(65) Prior Publication Data

US 2024/0113822 A1    Apr. 4, 2024

Related U.S. Application Data

(60) Provisional application No. 63/413,130, filed on Oct. 4, 2022.

(30) Foreign Application Priority Data

Feb. 17, 2023 (KR) .......................... 10-2023-0021698

(51) Int. Cl.
*H04L 5/00* (2006.01)
*H04L 27/26* (2006.01)

(52) U.S. Cl.
CPC .......... *H04L 5/0046* (2013.01); *H04L 5/0007* (2013.01); *H04L 27/2602* (2013.01)

(58) Field of Classification Search
CPC . H04L 5/0044; H04L 27/2602; H04L 5/0046; H04L 27/262; H04L 5/0007;
(Continued)

(56) References Cited

U.S. PATENT DOCUMENTS 10,785,706 B2    9/2020    Verma et al.
11,082,983 B2    8/2021    Chen et al.
(Continued)

FOREIGN PATENT DOCUMENTS

| KR | 10-2022-0004766 A | 1/2022 |
| KR | 10-2022-0088447 A | 6/2022 |
| KR | 10-2022-0113461 A | 8/2022 |

OTHER PUBLICATIONS

Communication dated Feb. 26, 2024, issued by European Patent Office in European Patent Application No. 23200066.1.
(Continued)

*Primary Examiner* — Khanh C Tran
(74) *Attorney, Agent, or Firm* — Sughrue Mion, PLLC

(57) ABSTRACT

The present disclosure provides methods and apparatuses for wireless communications. In some embodiments, a wireless communication method of a first device includes receiving a physical layer protocol data unit (PPDU) from a second device, and identifying a channel bandwidth of the PPDU based on a first field and a second field related to the channel bandwidth of the PPDU. The first field and the second field are extracted from a signal field included in the PPDU.

18 Claims, 17 Drawing Sheets

(58) Field of Classification Search
CPC ... H04L 5/001; H04L 27/2649; H04L 27/265; H04L 27/261; H04L 1/0069; H04L 1/1614; H04L 5/0094
See application file for complete search history.

(56) References Cited

U.S. PATENT DOCUMENTS

| | | | |
|---|---|---|---|
| 2016/0316473 A1* | 10/2016 | Wang | H04W 24/08 |
| 2021/0204243 A1 | 7/2021 | Choi et al. | |
| 2021/0273838 A1* | 9/2021 | Park | H04L 27/2602 |
| 2021/0400672 A1 | 12/2021 | Chen et al. | |
| 2022/0182881 A1 | 6/2022 | Suh et al. | |
| 2022/0255785 A1 | 8/2022 | Lim et al. | |
| 2022/0264367 A1 | 8/2022 | Tsujimaru | |
| 2022/0330273 A1 | 10/2022 | Kenney et al. | |
| 2023/0006770 A1* | 1/2023 | Park | H04L 1/00 |
| 2023/0061290 A1* | 3/2023 | Yu | H04L 5/0094 |
| 2023/0113253 A1 | 4/2023 | Park et al. | |
| 2023/0130228 A1* | 4/2023 | Park | H04L 1/0069 370/329 |

OTHER PUBLICATIONS

"IEEE P802.11be™/D3.0 Draft Standard for Information technology—Telecommunications and information exchange between systems Local and metropolitan area networks—Specific requirements", LAN/MAN Standards Committee of the IEEE Computer Society, Jan. 2023, 999 total pages, Part 11, Amendment 8.

* cited by examiner

FIG. 7A

| Two parts of U-SIG | Bit | Field | Number of bits | Description |
|---|---|---|---|---|
| U-SIG-1 | — | — | — | — |
| | B3-B5 | BW | 3 | Set to 0 for 20 MHz.<br>Set to 1 for 40 MHz.<br>Set to 2 for 80 MHz.<br>Set to 3 for 160 MHz.<br>Set to 4 for 320 MHz-1.<br>Set to 5 for 320 MHz-2.<br>Set to 6 for 640MHz. |
| | — | — | — | — |
| | B20-B21 | BW_EX | 2 | If the BW field is set to 6:<br>Set to 0 for 640 MHz-1.<br>Set to 1 for 640 MHz-2.<br>Set to 2 for 640 MHz-3.<br>Set to 3 for 640 MHz-4.<br>If the BW field is not set to 6, this field is reserved. |
| | — | — | — | — |

FIG. 7B

| Two parts of U-SIG | Bit | Field | Number of bits | Description |
|---|---|---|---|---|
| U-SIG-1 | — | — | — | — |
| | B3–B5 | BW | 3 | Set to 0 for 20 MHz.<br>Set to 1 for 40 MHz.<br>Set to 2 for 80 MHz.<br>Set to 3 for 160 MHz.<br>Set to 4 for 320 MHz-1.<br>Set to 5 for 320 MHz-2.<br>Set to 6 for 640 MHz-1 or 640 MHz-2.<br>Set to 7 for 640 MHz-3 or 640 MHz-4. |
| | — | — | — | — |
| | B20 | BW_EX | 1 | If the BW field is set to 6:<br>    Set to 0 for 640 MHz-1.<br>    Set to 1 for 640 MHz-2.<br>If the BW field is set to 7:<br>    Set to 0 for 640 MHz-3.<br>    Set to 1 for 640 MHz-4.<br>If the BW field is set to 0 or 1 or 2 or 3 or 4 or 5, this field is reserved. |
| | — | — | — | — |

FIG. 7C

| Two parts of U-SIG | Bit | Field | Number of bits | Description |
|---|---|---|---|---|
| U-SIG-1 | — | — | — | — |
| | B3-B5 | BW | 3 | Set to 0 for 20 MHz.<br>Set to 1 for 40 MHz.<br>Set to 2 for 80 MHz.<br>Set to 3 for 160 MHz.<br>Set to 4 for 320 MHz.<br>Set to 5 for 640 MHz. |
| | — | — | — | — |
| | B20-B21 | BW_EX | 2 | If the BW field is set to 4:<br>  Set to 0 for 320 MHz-1.<br>  Set to 1 for 320 MHz-2.<br>If the BW field is set to 5:<br>  Set to 0 for 640 MHz-1.<br>  Set to 1 for 640 MHz-2.<br>  Set to 2 for 640 MHz-3.<br>  Set to 3 for 640 MHz-4.<br>If the BW field is not set to 4 or 5, this field is reserved. |
| | — | — | — | — |

FIG. 9

| Two parts of U-SIG | Bit | Field | Number of bits | Description |
|---|---|---|---|---|
| | — | — | — | — |
| U-SIG-1 | B3-B6 | BW' | 4 | Set to 0 for 20 MHz.<br>Set to 1 for 40 MHz.<br>Set to 2 for 80 MHz.<br>Set to 3 for 160 MHz.<br>Set to 4 for 320 MHz-1.<br>Set to 5 for 320 MHz-2.<br>Set to 6 for 640 MHz-1.<br>Set to 7 for 640 MHz-2.<br>Set to 8 for 640 MHz-3.<br>Set to 9 for 640 MHz-4. |
| | — | — | — | — |

DEVICE AND METHOD FOR SUPPORTING COMMUNICATION USING PLURALITY OF BANDWIDTHS IN WIRELESS LOCAL AREA NETWORK SYSTEM

CROSS-REFERENCE TO RELATED APPLICATIONS

This application is based on and claims priority under 35 U.S.C. § 119 to Korean Patent Application No. 10-2023-0021698, filed on Feb. 17, 2023, in the Korean Intellectual Property Office, and to U.S. Provisional Application No. 63/413,130, filed on Oct. 4, 2022, in the United States Patent and Trademark Office, the disclosures of which are incorporated by reference herein in their entirety.

BACKGROUND

The present disclosure relates generally to wireless communications, and more particularly, to devices and methods for supporting communication using a plurality of bandwidths in a wireless local area network (WLAN) system.

As an example of wireless communication, a wireless local area network (WLAN) may refer to a technology for connecting two or more devices to each other by using a wireless signal transmission method. For example, the WLAN technology may be based on the Institute of Electrical and Electronics Engineers (IEEE) 802.11 standard. The 802.11 standard has evolved into several versions (e.g., 802.11b, 802.11a, 802.11g, 802.11n, 802.11ac, 802.11ax, and the like), which may support a transmission rate up to 1 gigabyte/second, based on several technologies such as, but not limited to, orthogonal frequency-division multiplexing (OFDM).

In a WLAN based on the IEEE 802.11ac standard, data may be simultaneously transmitted to multiple users through a multi-user multi-input multi-output (MU-MIMO) technique. In another WLAN based on the IEEE 802.11ax standard, which may also be referred to as high efficiency (HE), both MU-MIMO and orthogonal frequency-division multiple access (OFDMA) may be applied to divide and provide usable subcarriers to users, thereby implementing multiple access. Accordingly, WLAN systems to which the IEEE 802.11ax has been applied may effectively support communication in dense areas and/or outdoors.

The IEEE 802.11be standard, which may also be referred to as extremely high throughput (EHT), may implement support of a 6 gigahertz (GHz) unlicensed frequency band, support of various bandwidths per channel, introduction of hybrid automatic repeat and request (HARM), support of maximum 16×16 MIMO, and the like. Accordingly, next generation WLAN systems may be expected to provide support for features such as, but not limited to, low-latency and ultra-high-speed transmission, that may be supported by other wireless communication systems, such as fifth generation (5G), new radio (NR), and the like.

For example, support for a bandwidth of up to 640 megahertz (MHz) per channel in 802.11be has been proposed to be included in a next generation of EHT, which may also be referred to as ultra-high reliability (UHR) in order to potentially increase spectrum efficiency and transmission rate.

SUMMARY

Example embodiments of the present disclosure provide a device and method for indicating a bandwidth determined to be used for communication, from among a plurality of bandwidths, in a wireless local area network (WLAN) system.

According to an aspect of the present disclosure, a wireless communication method of a first device is provided. The wireless communication method includes receiving a physical layer protocol data unit (PPDU) from a second device, and identifying a channel bandwidth of the PPDU based on a first field and a second field related to the channel bandwidth of the PPDU. The first field and the second field are extracted from a signal field included in the PPDU.

According to an aspect of the present disclosure, a wireless communication method of a first device is provided. The wireless communication method includes receiving a PPDU from a second device, extracting, from a signal field included in the PPDU, an extended field related to a channel bandwidth of the PPDU, and identifying, based on a value of the extended field, whether the channel bandwidth of the PPDU is at least one of 20 megahertz (MHz), 40 MHz, 80 MHz, 160 MHz, 320 MHz, and 640 MHz.

According to an aspect of the present disclosure, a wireless communication method of a second device for communicating with a first device is provided. The wireless communication method includes determining a channel bandwidth for transmitting a PPDU to the first device, generating a first field and a second field indicating the channel bandwidth, generating the PPDU including the first field and the second field and conforming to the channel bandwidth, and transmitting the PPDU to the first device.

According to an aspect of the present disclosure, a wireless communication method of a second device for communicating with a first device is provided. The wireless communication method includes determining a channel bandwidth for transmitting a PPDU to the first device, generating an extended field indicating the channel bandwidth, generating the PPDU including the extended field and conforming to the channel bandwidth, and transmitting the PPDU to the first device. The channel bandwidth is at least one of 20 MHz, 40 MHz, 80 MHz, 160 MHz, 320 MHz, and 640 MHz.

According to an aspect of the present disclosure, a first device configured to communicate with a second device in a WLAN system is provided. The first device includes a transceiver configured to receive a PPDU from the second device, and a signal processor configured to extract, from a signal field included in the PPDU, at least one of a first field and a second field related to a channel bandwidth of the PPDU, and identify, based on at least one of a first value of the first field and a second value of the second field, the channel bandwidth of the PPDU.

According to an aspect of the present disclosure, a second device configured to communicate with a first device in a WLAN system is provided. The second device includes a transceiver configured to transmit a PPDU to the first device, and a signal processor configured to determine a channel bandwidth for transmitting the PPDU, generate a first field and a second field indicating the channel bandwidth, and generate the PPDU including the first field and the second field and conforming to the channel bandwidth.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which:

FIGS. 7A, 7B, and 7C are diagrams illustrating a method of identifying a channel bandwidth by using U-SIG-1, according to an embodiment;

FIG. 9 is a diagram illustrating a method of identifying a channel bandwidth by using U-SIG-1, according to an embodiment;

DETAILED DESCRIPTION

Figure 1:
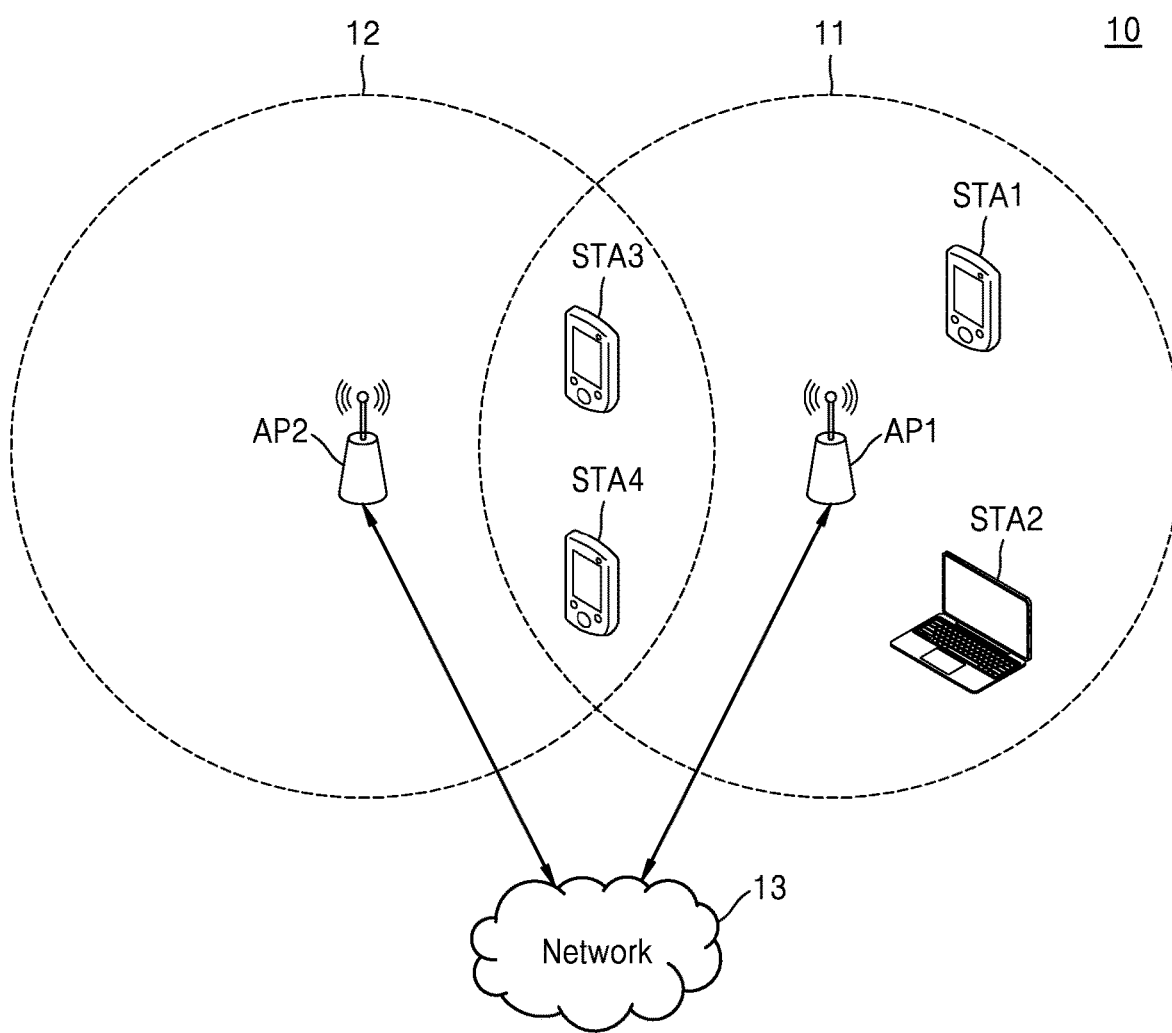
FIG. 1 is a diagram illustrating a wireless communication system, according to an embodiment.

FIG. 1 is a diagram illustrating a wireless communication system 10, according to an embodiment. Referring to FIG. 1, a wireless local area network (WLAN) system as an example of the wireless communication system 10 is illustrated.

As described herein, the wireless communication system 10 may be and/or may include a wireless communication system based on an Institute of Electrical and Electronics Engineers (IEEE) 802.11 standard, and/or may perform orthogonal frequency-division multiplexing (OFDM) and/or orthogonal frequency-division multiple access (OFDMA)-based wireless communications. However, the present disclosure is not limited in this regard, and the present disclosure may also be applied to other communication systems (e.g., a cellular communication system, such as long-term evolution (LTE), LTE-advanced (LTE-A), fifth generation (5G), new radio (NR), wireless broadband (WiBro), or global system for mobile communication (GSM), or a short-range communication system, such as Bluetooth™, Bluetooth Low Energy (BLE), or near-field communication (NFC)) having similar technical backgrounds and channel forms, without departing from the scope of the present disclosure.

In addition, various functions described below may be implemented or supported by artificial intelligence technology or one or more computer programs. Each of the programs may be composed of computer-readable program code and/or implemented in a computer-readable medium. The terms "application" and "program" may refer to one or more computer programs, software components, instruction sets, procedures, functions, objects, classes, instances, related data, or parts thereof adapted for implementation of suitable computer-readable program code. The term "computer-readable program code" may include all types of computer code, including source code, object code, and execution code. The term "computer-readable medium" may include all types of media capable of being accessed by a computer, such as, but not limited to, read-only memory (ROM), random-access memory (RAM), a hard disk drive, a compact disc (CD), a digital video disc (DVD), or any other type of memory. A "non-transitory" computer-readable medium may exclude wired, wireless, optical, or other communication links that may transmit transitory electrical and/or other signals. The non-transitory computer-readable medium may include a medium in which data may be permanently stored, and/or a medium in which data may be stored and overwritten later, such as, but not limited to, a rewritable optical disk and/or an erasable memory device.

In various embodiments described below, a hardware approach is described as an example. However, the various embodiments may include technology using both hardware and software, and thus do, may not exclude a software-based approach.

In addition, terms referring to control information, terms referring to entries, terms referring to network entities, terms referring to messages, terms referring to components of a device, and the like used in the following description are examples provided for convenience of description. Accordingly, the present disclosure is not limited to the terms described below, and other terms having equivalent technical meanings may be used.

Referring to FIG. 1, the wireless communication system 10 may include a first access point AP1, a second access point AP2, a first station STA1, a second station STA2, a third station STA3, and a fourth station STA4. The first and second access points AP1 and AP2 may access a network 13 that may include, but not be limited to, the Internet, an internet protocol (IP) network, or any other network. The first access point AP1 may provide the first station STA1, the second station STA2, the third station STA3, and the fourth station STA4 with access to the network 13 within a first coverage area 11. Alternatively or additionally, the second access point AP2 may provide the third and fourth stations STA3 and STA4 with access to the network 13 within a second coverage area 12. In some embodiments, the first and second access points AP1 and AP2 may communicate with at least one of the first station STA1, the second station STA2, the third station STA3, and the fourth station STA4 based on a wireless communication technology such as, but not limited to, a Institute of Electrical and Electronics Engineers (IEEE) 802.11 standard, Wireless Fidelity (Wi-Fi), or any other WLAN access technology.

An access point may be referred to as a router, a gateway, or the like. Alternatively or additionally, a station may be referred to as a mobile station, a subscriber station, a terminal, a mobile terminal, a wireless terminal, user equipment, a user, or the like. The station may be and/or may include a mobile device (e.g., a mobile phone, a laptop computer, a wearable device, or the like), and/or a stationary device (e.g., a desktop computer, a smart television (TV), or the like). In an embodiment, a station may be referred to as a first device and an access point may be referred to as a second device.

The access point may determine any one of a plurality of channel bandwidths as a channel bandwidth used to communicate with the station. In an embodiment, a channel bandwidth may be referred to as a bandwidth. In an embodiment, the plurality of channel bandwidths may include 20 megahertz (MHz), 40 MHz, 80 MHz, 160 MHz, 320 MHz, and 640 MHz. The access point may set a value of at least one field of a physical layer protocol data unit (PPDU) to inform the station of the determined channel bandwidth. In an embodiment, an operation of setting a value of a field may be defined as an operation of generating a field.

In an embodiment, the access point may indicate the determined channel bandwidth by using a first field and a second field of a signal field included in the PPDU. In an embodiment, the indicating of the determined channel bandwidth may include indicating an arrangement type of the determined channel bandwidth. The arrangement types of channel bandwidths are described with reference to FIGS. 6A and 6B. Alternatively or additionally, the second field may be used to identify a channel bandwidth of a PPDU which may be greater than or equal to a reference bandwidth. For example, the second field may refer to a field that may be set to indicate that a channel bandwidth of 640 MHz, which may correspond to the reference bandwidth, has been determined to be used for communication.

In an embodiment, the station may extract at least one of the first field and the second field from the signal field included in the PPDU. Alternatively or additionally, the station may identify the channel bandwidth of the PPDU based on at least one of a value of the first field and a value of the second field.

In an embodiment, the access point may indicate the determined channel bandwidth by using an extended first field of the signal field included in the PPDU. In an optional or additional embodiment, the extended first field may refer to an existing first field to which at least one bit has been added to indicate that the channel bandwidth of 640 MHz has been determined to be used for communication.

In an embodiment, the station may extract the extended first field from the signal field included in the PPDU and may identify the channel bandwidth of the PPDU based on a value of the extended first field.

An access point of the wireless communication system 10, according to an embodiment, may inform a station of a channel bandwidth determined for communication, from among a plurality of channel bandwidths that may include 640 MHz, based on a signal field of a PPDU that may have been generated as described above. Alternatively or additionally, a station of the wireless communication system 10 may identify the determined channel bandwidth from the signal field of the PPDU and decode the PPDU based on a result of the identifying. Accordingly, the wireless communication system 10 may effectively perform communication using various channel bandwidths.

It is to be understood that the wireless communication system 10 may further support various channel bandwidths greater than 640 MHz. That is, the present disclosure may be applied to indicate a channel bandwidth determined for communication, from among such various channel bandwidths.

Figure 2:
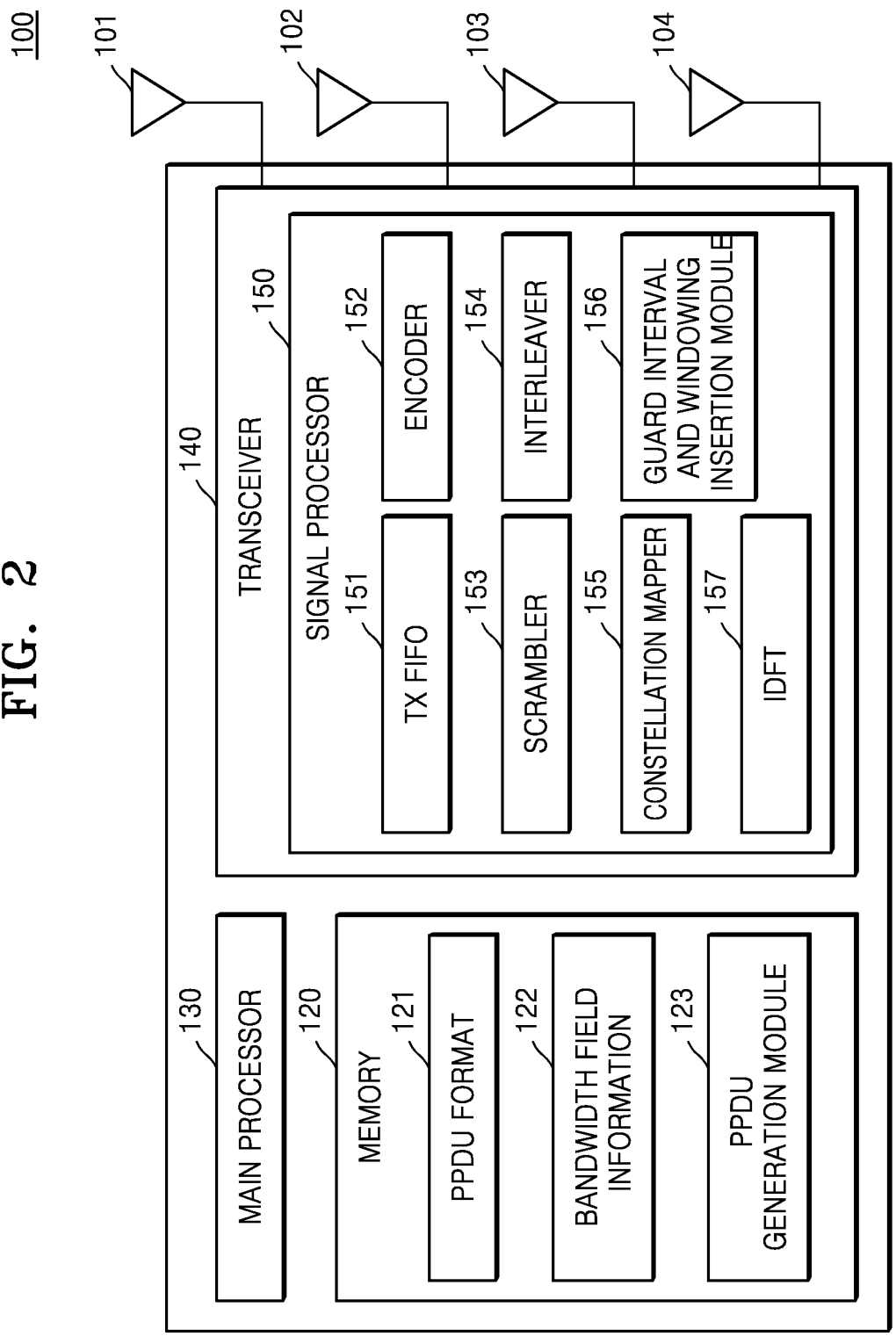
FIG. 2 is a block diagram illustrating a device, according to an embodiment.

FIG. 2 is a block diagram illustrating a device 100, according to an embodiment. The device 100 of FIG. 2 may be and/or may include a second device (e.g., an access point), which may be a transmission device including a transceiver capable of data communication. Alternatively or additionally, the device 100 may be and/or may include a first device (e.g., a station), which may be a receiving device including a transceiver capable of data communication. That is, the device 100 of FIG. 2 may be and/or may include any one of the first and second access points AP1 and AP2, and the first to fourth stations STA1, STA2, STA3, and STA4 as shown in FIG. 1. Alternatively or additionally, the device 100 may be applied to, for example, a sensor, a computer, a smartphone, a portable electronic device, a tablet, a wearable device, an Internet of Things (IoT) device, and the like.

Hereinafter, a case in which the device 100 is a second device, which may be the transmission device, is described as an example.

The device 100 may include a main processor 130, a memory 120, a transceiver 140, and a plurality of antenna arrays (e.g., first antenna array 101, second antenna array 102, third antenna array 103, and fourth antenna array 104). The main processor 130, the memory 120, the transceiver 140, and the antenna arrays 101 to 104 may be directly and/or indirectly connected to each other.

The main processor 130 may control the memory 120 and the transceiver 140. The memory 120 may store a PPDU format 121, a bandwidth field information 122, and the like. The transceiver 140 may generate a PPDU by using the PPDU format 121, the bandwidth field information 122, and the like, stored in the memory 120. The transceiver 140 may transmit the generated PPDU to a first device, which may be an external receiving device, through the plurality of antenna arrays 101 to 104.

In an embodiment, the memory 120 may store the PPDU format 121, which may include a format related to a signal field, according to an embodiment, and the bandwidth field information 122 which may include information about values indicating channel bandwidths. Alternatively or additionally, the memory 120 may store processor-executable instructions for executing a PPDU generation module 123. The processor-executable instructions stored in the memory 120 may be executed by the main processor 130 and/or by a signal processor 150 that may be included in the transceiver 140.

In an embodiment, the signal processor 150 may generate a PPDU indicating a channel bandwidth determined for communication, from among a plurality of channel bandwidths, based on the PPDU format 121 and the bandwidth field information 122. The generation of the PPDU is described below with reference to FIG. 7A and the like.

The signal processor 150 may include various modules (e.g., various modules of a transmit path) configured to generate each section of a PPDU and/or various types of communication transmission units. Although FIG. 2 illustrates an embodiment in which the signal processor 150 is included in the transceiver 140, this is only an example, and embodiments are not limited thereto. For example, the signal processor 150 may be implemented as a separate component independent from the transceiver 140.

The signal processor 150 may include a transmit first-in-first-out (TX FIFO) 151, an encoder 152, a scrambler 153, an interleaver 154, a constellation mapper 155, an inverse discrete Fourier transformer (IDFT) 157, and a guard interval and windowing insertion module 156. The constellation mapper 155 may be configured to generate a quadrature amplitude modulation (QAM) symbol. The guard interval and windowing insertion module 156 may be configured to provide a guard interval on a frequency to reduce interference on a spectrum and transform a signal through windowing.

It may be understood that the transceiver 140 may include components well known to one of ordinary skill in the art, as illustrated in the drawing. Alternatively or additionally, such components may be executed by a method well known to one of ordinary skill in the art by using hardware, firmware, software logic, or a combination thereof.

When the device 100 is a first device, which may be and/or may include a receiving device, the transceiver 140 may include components in a receiving path. That is, when the device 100 is the first device, the transceiver 140 may receive a PPDU and identify, from the PPDU, a channel bandwidth determined for communication. For example, the signal processor 150 may extract at least one field of a preamble included in the PPDU and decode the extracted at least one field to identify the determined channel bandwidth. Alternatively or additionally, the signal processor 150 may determine whether the identified channel bandwidth matches a preset channel bandwidth and perform decoding on the PPDU based on a result of the determining.

In an optional or additional embodiment, at least a portion of the decoding of the PPDU may be performed by a component other than the signal processor 150 (e.g., the main processor 130) either alone or in conjunction with the signal processor 150. That is, a case in which the signal processor 150 decodes the received PPDU is described as a non-limiting example.

The number and arrangement of components of the device 100 shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Alternatively or additionally, a set of (one or more) components shown in FIG. 2 may be integrated with each other, and/or may be implemented as an integrated circuit, as software, and/or a combination of circuits and software.

Figure 3:
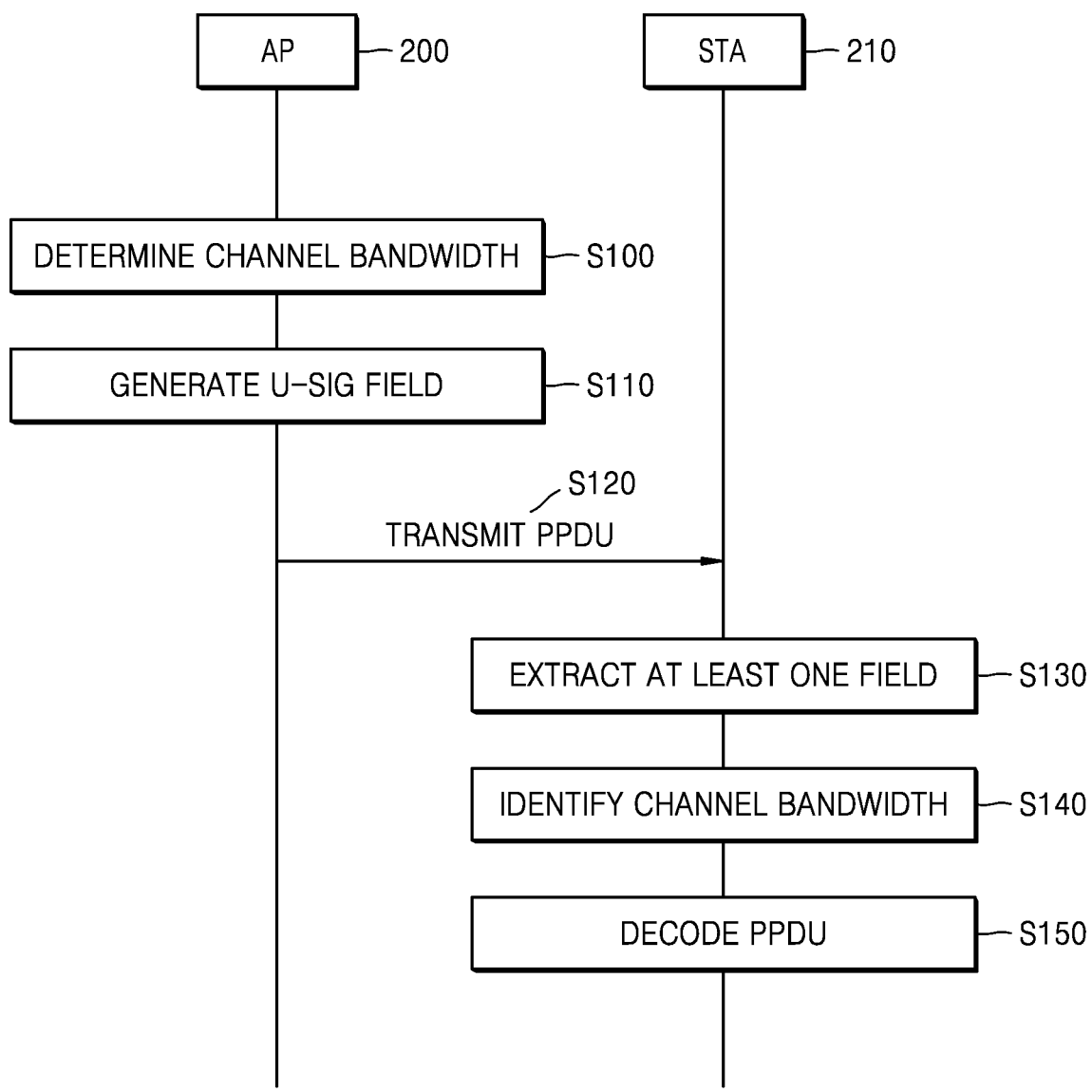
FIG. 3 is a flowchart illustrating an operating method of a wireless communication system, according to an embodiment.

FIG. 3 is a flowchart illustrating an operating method of a wireless communication system, according to an embodiment. The wireless communication system may include an access point 200 and a station 210.

Referring to FIG. 3, in operation S100, the access point 200 may determine, from among a plurality of channel bandwidths, a channel bandwidth for communication with the station 210. In an embodiment, the plurality of channel bandwidths may include 20 MHz, 40 MHz, 80 MHz, 160 MHz, 320 MHz, and 640 MHz. Alternatively or additionally, the access point 200 may inform the station 210 of the determined channel bandwidth in advance, and the station 210 may store the channel bandwidth in a memory as a preset channel bandwidth.

In operation S110, the access point 200 may generate a universal signal (U-SIG) field based on the channel bandwidth determined in operation S100. In an embodiment, the U-SIG field may include a first field and a second field for indicating any one of the plurality of channel bandwidths. In some embodiments, the U-SIG field may include an extended first field for indicating any one of the plurality of channel bandwidths.

In operation S120, the access point 200 may transmit, to the station 210, a PPDU including the U-SIG field generated in operation S110.

In operation S130, the station 210 may extract at least one field from the received PPDU.

In operation S140, the station 210 may identify a channel bandwidth based on a value of the at least one extracted field.

In operation S150, the station 210 may decode the PPDU based on the identified channel bandwidth. For example, the station 210 may decode the PPDU and/or skip decoding of the PPDU based on whether the identified channel bandwidth matches the preset channel bandwidth.

Figure 4:
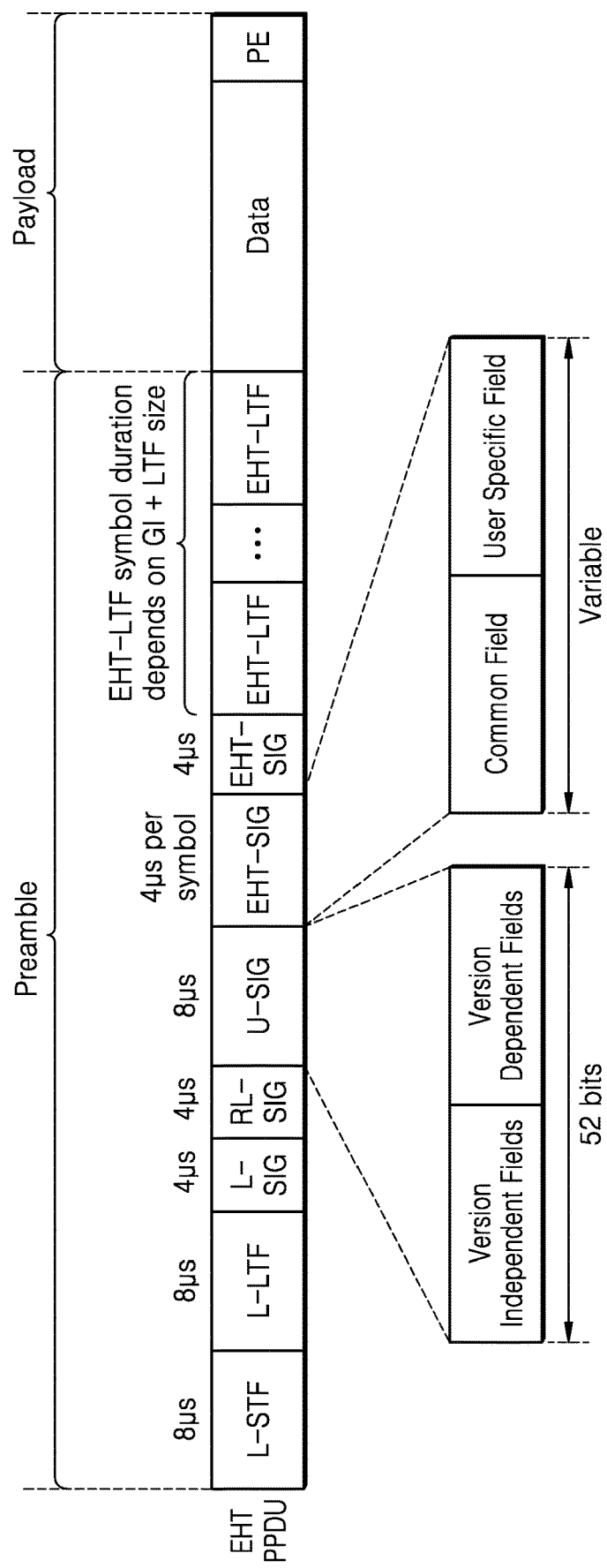
FIG. 4 is a diagram illustrating a physical layer protocol data unit (PPDU), according to an embodiment.

FIG. 4 is a diagram illustrating a PPDU, according to an embodiment. Referring to FIG. 4, the structure of an extremely high throughput (EHT) PPDU is illustrated. Hereinafter, embodiments may be described focusing on standards related to EHT. However, the present disclosure is not limited in this regard, and aspects of the present disclosure may be applied to next generation standards related to ultra-high reliability (UHR), for example. In such an example, an EHT PPDU may be referred to as a UHR PPDU.

As shown in FIG. 4, the EHT PPDU may include a preamble including training fields and signal fields, and a payload including a data field. In the EHT PPDU, the preamble may include a legacy-short training field (L-STF), a legacy-long training field (L-LTF), a legacy-signal (L-SIG) field, a repeated legacy-signal (RL-SIG) field, a U-SIG field, an EHT-signal (EHT-SIG) field, an EHT-short training field (EHT-STF), and an EHT-long training field (EHT-LTF). Alternatively or additionally, the payload of the EHT PPDU may include a data field and a packet extension (PE) field. In an embodiment, a U-SIG field and an EHT-SIG field may be referred to as a U-SIG and an EHT-SIG, respectively. In addition, as described above, in next generation standards related to UHR, an EHT-SIG field may be referred to as a UHR-SIG field.

The L-STF may include short training OFDM symbols and may be used for frame detection, automatic gain control (AGC), diversity detection, and coarse frequency/time synchronization. The L-LTF may include long training OFDM symbols and may be used for fine frequency/time synchronization and channel estimation. The L-SIG field may be used for transmission of control information and may include information about a data rate and a data length. In some embodiments, the L-SIG field may be repeated in the RL-SIG field.

The U-SIG field (or U-SIG) may include control information common to at least one station that receives the EHT PPDU. For example, as shown in FIG. 4, the U-SIG field may include version-independent fields and version-dependent fields. In some embodiments, the U-SIG field may further include fields corresponding to a cyclic redundancy check (CRC) and a tail, respectively, and reserved bits. The version-independent fields may have static positions and bit definitions in different generations and/or physical versions. In some embodiments, the U-SIG field may be modulated based on a single modulation scheme (e.g., binary phase-shift keying (BPSK)). An example of the U-SIG field is described below with reference to FIG. 5.

The EHT-SIG field may have a variable modulation and coding scheme (MCS) and length. For example, when the EHT PPDU is transmitted to multiple users, the EHT-SIG field may include a common field including common control information, and a user-specific field including user-dependent control information, as shown in FIG. 4. In an embodiment, the U-SIG field may have a fixed length (e.g., a length of 52 bits). Alternatively or additionally, the EHT-SIG field may have a variable length. The common field may include U-SIG overflow, the total number of non-OFDMA users, and a resource unit (RU) allocation subfield (RUA). A user-specific field for non-multi-user multi-input multi-output (MU-MIMO) may include an STA-ID subfield, an MCS subfield, an $N_{STS}$ subfield, a beamformed subfield, and a coding subfield, and a user-specific field for MU-MIMO may include an STA-ID subfield, an MCS subfield, a coding subfield, and a spatial configuration subfield. In some embodiments, the EHT-SIG field may be modulated based on one of two or more modulation schemes, for example, BPSK, quadrature BPSK (QBPSK), and the like.

Figure 5:
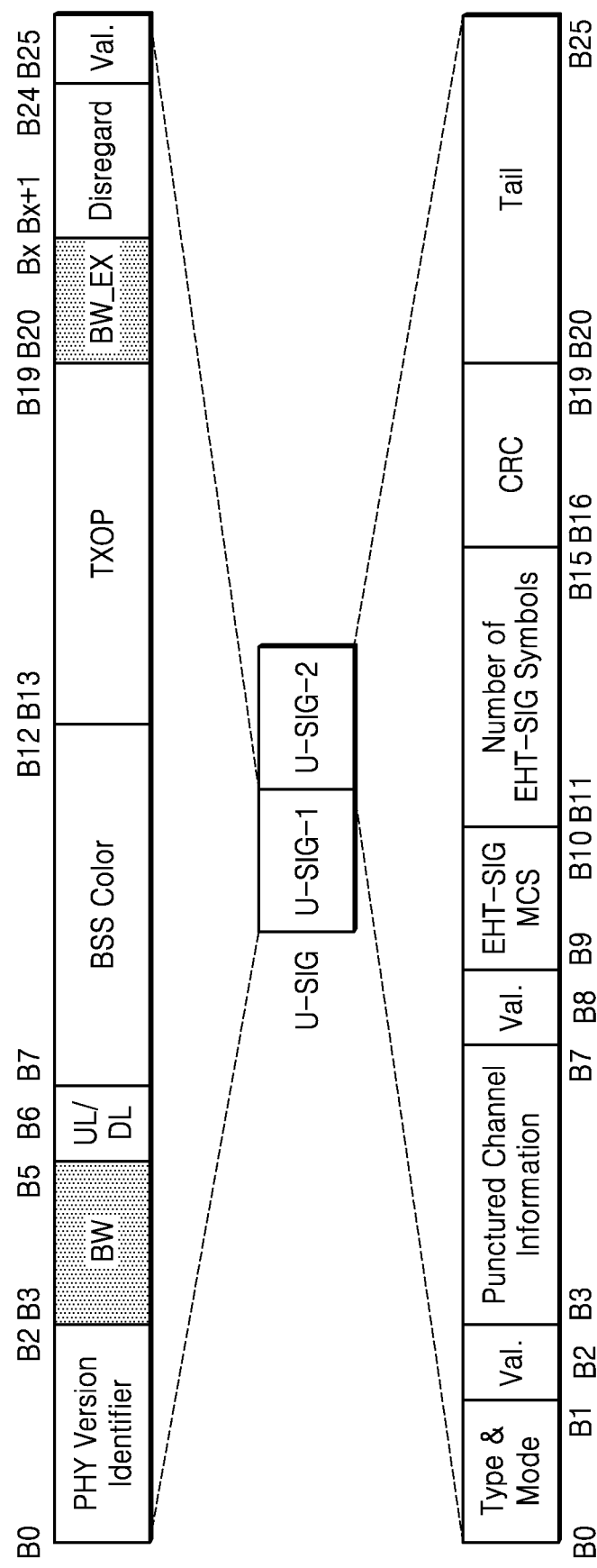
FIG. 5 is a diagram illustrating a universal signal (U-SIG) field, according to an embodiment.

FIG. 5 is a diagram illustrating a U-SIG field, according to an embodiment. As described above with reference to FIG. 4, the U-SIG field may be included in an EHT PPDU, and an EHT-SIG field may follow the U-SIG field.

Referring to FIG. 5, the U-SIG field may include U-SIG-1 and U-SIG-2. As shown in FIG. 5, U-SIG-1 may be composed of bits B0 to B25 and U-SIG-2 may be composed of another bits B0 to B25. That is, U-SIG-1 may have a length of 26 bits and U-SIG-2 may have a length of 26 bits. U-SIG-1 may include a first field BW and a second field BW_EX for indicating a channel bandwidth determined for communication, the first field BW may be composed of 3 bits B3 to B5, and the second field BW_EX may be composed of a bits B20 to Bx, where x is a positive integer greater than zero (0).

Although FIG. 5 illustrates an embodiment in which the second field BW_EX is arranged in a disregard field corresponding to a reserved field, this is only an example, and embodiments are not limited thereto. For example, the second field BW_EX may be arranged by using another reserved field (e.g., a validate (Val.) field) of U-SIG-1. In addition, although FIG. 5 illustrates an embodiment in which the second field BW_EX is arranged in B20 to Bx, this is only an example, and embodiments are not limited thereto. The second field BW_EX may be arranged in various positions of at least one reserved field.

In an embodiment, U-SIG-1 may include, as version-independent fields, a physical version identifier field (3 bits), a bandwidth field which is the first field BW (3 bits), an uplink (UL)/downlink (DL) field (1 bit), a basic service set (BSS) color field (6 bits), a transmit opportunity (TXOP) field (7 bits), and a bandwidth addition field which is the second field BW_EX ($\alpha$ bits). The first field BW and the second field BW_EX are described below with reference to FIGS. 7A to 7C. In an optional or additional embodiment, U-SIG-2 may include, as version-dependent fields, a PPDU type and compression mode field (2 bits), a punctured channel information field (5 bits), an EHT-SIG MCS field (2 bits), and a number of EHT-SIG symbols field (5 bits).

As shown in FIG. 5, the first field BW and the second field BW_EX may be arranged apart from each other by certain bits on the U-SIG field. That is, the U-SIG field may include at least one field arranged between the first field BW and the second field BW_EX. In some embodiments, the first field BW and the second field BW_EX may be continuously arranged.

In an embodiment, the first field BW may indicate that a channel bandwidth is 640 MHz and the second field BW_EX may indicate an arrangement type of the channel bandwidth of 640 MHz.

In an optional or additional embodiment, a combination of the first field BW and the second field BW_EX may indicate that the channel bandwidth is 640 MHz and may indicate an arrangement type of the channel bandwidth of 640 MHz.

In some embodiments, the first field BW may indicate that the channel bandwidth is 320 MHz and the second field BW_EX may indicate an arrangement type of the channel bandwidth of 320 MHz.

In some optional or additional embodiments, a combination of the first field BW and the second field BW_EX may indicate that the channel bandwidth is 320 MHz and may indicate an arrangement type of the channel bandwidth of 320 MHz.

Figure 6A:
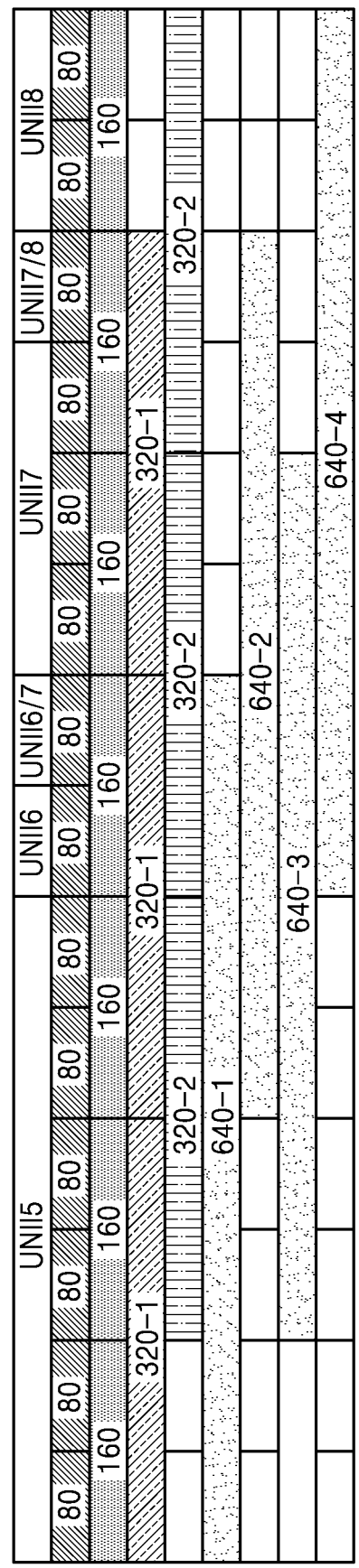
FIGS. 6A and 6B are diagrams illustrating arrangement examples of channel bandwidths, according to an embodiment.
Figure 6B:
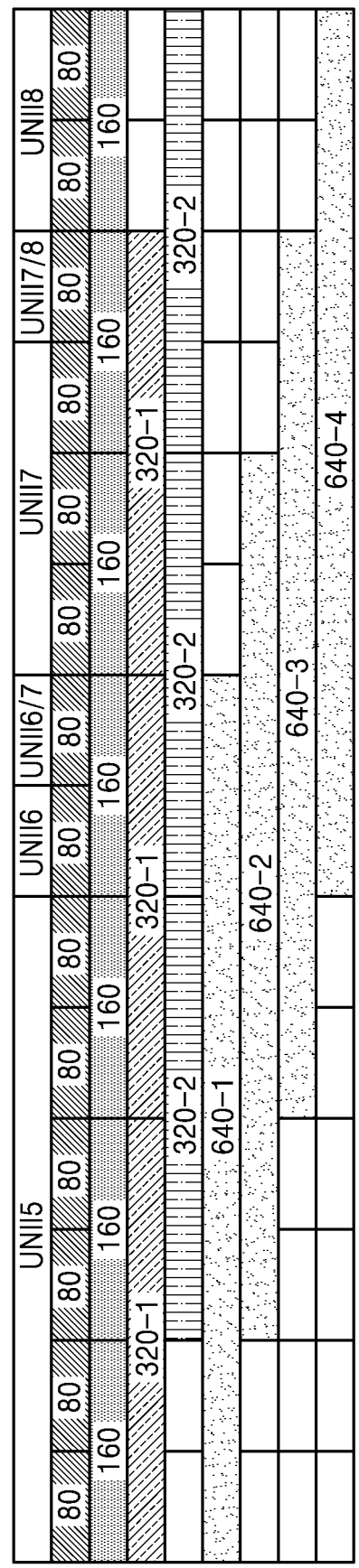

FIGS. 6A and 6B are diagrams illustrating arrangement examples of channel bandwidths, according to an embodiment.

Referring to FIGS. 6A and 6B, the arrangement examples of channel bandwidths are shown in relation to a plurality of channels of a 6 gigahertz (GHz) unlicensed frequency band that may include Unlicensed National Information Infrastructure (UNII) 5, UNII 6, UNII 6/7, UNII 7, UNII 7/8, and UNII8. Each unlicensed frequency band may have a distinct frequency domain/range. The plurality of channels may be set (e.g., arranged) within one or more channels of the 6 GHz unlicensed frequency band. While a bandwidth (or channel bandwidth) of each channel may be determined as any one of 20 MHz, 40 MHz, 80 MHz, 160 MHz, 320 MHz, and 640 MHz for communication, for convenience of description, FIGS. 6A and 6B may only illustrate arrangement examples of channel bandwidths of 80 MHz, 160 MHz, 320 MHz, and 640 MHz.

Referring to FIGS. 6A and 6B, bandwidths 320-1 (or 320 MHz-1) may indicate a channel bandwidth of 320 MHz with a first arrangement type. As shown in FIGS. 6A and 6B, the channel bandwidth of 320 MHz-1 may be arranged in a portion of UNII5. Alternatively or additionally, the channel bandwidth of 320 MHz-1 may be arranged over another portion of UNII5, and over UNII6 and UNII6/7. For another example, the channel bandwidth of 320 MHz-1 may be arranged over UNII7 and UNII7/8.

Continuing to refer to FIGS. 6A and 6B, bandwidths 320-2 (or 320 MHz-2) may indicate a channel bandwidth of 320 MHz with a second arrangement type. As shown in FIGS. 6A and 6B, the channel bandwidth of 320 MHz-2 may be arranged in another portion of UNII5. Alternatively or additionally, the channel bandwidth of 320 MHz-2 may be arranged over UNII6, UNII6/7, and a portion of UNII7. For another example, the channel bandwidth of 320 MHz-2 may be arranged over the remainder of UNII7, UNII7/8, and UNII8.

Continuing to refer to FIGS. 6A and 6B, bandwidth 640-1 (or 640 MHz-1) may indicate a channel bandwidth of 640 MHz with a third arrangement type. As shown in FIG. 6A, the channel bandwidth of 640 MHz-1 may be arranged over UNII5, UNII6, and UNII6/7.

Continuing to refer to FIGS. 6A and 6B, bandwidth 640-2 (or 640 MHz-2) may indicate a channel bandwidth of 640 MHz with a fourth arrangement type. As shown in FIG. 6A, the channel bandwidth of 640 MHz-2 may be arranged over a portion of UNII5, UNII6, UNII6/7, UNII7, and UNII7/8.

Continuing to refer to FIGS. 6A and 6B, bandwidth 640-3 (or 640 MHz-3) may indicate a channel bandwidth of 640 MHz with a fifth arrangement type. As shown in FIG. 6A, the channel bandwidth of 640 MHz-3 may be arranged over another portion of UNII5, UNII6, UNII6/7, and a portion of UNII7.

Continuing to refer to FIGS. 6A and 6B, bandwidth 640-4 (or 640 MHz-4) may indicate a channel bandwidth of 640 MHz with a sixth arrangement type. As shown in FIG. 6A, the channel bandwidth of 640 MHz-4 may be arranged over UNII6, UNII6/7, UNII7, UNII7/8, and UNII8.

In an embodiment, an access point may form a channel bandwidth of 640 MHz by using channel bandwidths of 320 MHz arranged adjacent to each other on a mutual frequency axis. For example, 640 MHz-1 may be formed by using 320 MHz-1 arranged in a portion of UNII5 and 320 MHz-1 arranged over the remainder of UNII5, UNII6, and UNII6/7. For another example, 640 MHz-2 may be formed by using 320 MHz-1 arranged over the remainder of UNII5, UNII6, and UNII6/7 and 320 MHz-1 arranged over UNII7 and UNII7/8. For yet another example, 640 MHz-3 may be formed by using 320 MHz-2 arranged in another portion of UNII5 and 320 MHz-2 arranged over UNII6, UNII6/7, and a portion of UNII7. For yet another example, 640 MHz-4 may be formed by using 320 MHz-2 arranged over UNII6, UNII6/7, and a portion of UNII7 and 320 MHz-2 arranged over the remainder of UNII7, UNII7/8, and UNII8.

In FIG. 6B, arrangement examples different from the arrangement examples of channel bandwidths of 640 MHz in FIG. 6A may be applied.

Referring further to FIG. 6B, bandwidth 640-1 (or 640 MHz-1) may indicate a channel bandwidth of 640 MHz with the third arrangement type, in which the channel bandwidth of 640 MHz-1 may be arranged over UNII5, UNII6, and UNII6/7. Bandwidth 640-2 (or 640 MHz-2) may indicate a channel bandwidth of 640 MHz with the fourth arrangement type, in which the channel bandwidth of 640 MHz-2 may be arranged over a portion of UNII5, UNII6, UNII6/7, and a portion of UNII7. Bandwidth 640-3 (or 640 MHz-3) may indicate a channel bandwidth of 640 MHz with the fifth arrangement type, in which the channel bandwidth of 640 MHz-3 may be arranged over another portion of UNII5, UNII6, UNII6/7, UNII7, and UNII7/8. Bandwidth 640-4 (640 MHz-4) may indicate a channel bandwidth of 640 MHz with the sixth arrangement type, in which channel bandwidth of 640 MHz-4 may be arranged over UNII6, UNII6/7, UNII7, UNII7/8, and UNII8.

In an embodiment, an access point may form a channel bandwidth of 640 MHz by using channel bandwidths of 320 MHz arranged adjacent to each other on a mutual frequency axis. For example, 640 MHz-1 may be formed by using 320 MHz-1 arranged in a portion of UNII5 and 320 MHz-1 arranged over the remainder of UNII5, UNII6, and UNII6/7. For another example, 640 MHz-2 may be formed by using 320 MHz-2 arranged in another portion of UNII5 and 320 MHz-2 arranged over UNII6, UNII6/7, and a portion of UNII7. For yet another example, 640 MHz-3 may be formed by using 320 MHz-1 arranged over the remainder of UNII5, UNII6, and UNII6/7 and 320 MHz-1 arranged over UNII7 and UNII7/8. For yet another example, 640 MHz-4 may be formed by using 320 MHz-2 arranged over UNII6, UNII6/7, and a portion of UNII7 and 320 MHz-2 arranged over the remainder of UNII7, UNII7/8, and UNII8.

However, the arrangement examples of channel bandwidths of 640 MHz in FIGS. 6A and 6B are non-limiting examples, and embodiments of the present disclosure may not be limited thereto. That is, the present disclosure may be applied to various arrangement examples other than the ones illustrated in FIGS. 6A and 6B.

FIGS. 7A, 7B, and 7C are diagrams illustrating a method of identifying a channel bandwidth by using U-SIG-1, according to an embodiment.

Referring to FIG. 7A, the value of the first field BW may be composed of three bits B3 to B5 in U-SIG-1 and may be set to any one of '0', '1', '2', '3', '4', '5', and '6'. For example, in the first field BW, '0' may indicate a channel bandwidth of 20 MHz, '1' may indicate a channel bandwidth of 40 MHz, '2' may indicate a channel bandwidth of 80 MHz, '3' may indicate a channel bandwidth of 160 MHz, '4' may indicate a channel bandwidth of 320 MHz with a first arrangement type (e.g., 320-1 of FIGS. 6A and 6B), '5' may indicate a channel bandwidth of 320 MHz with a second arrangement type (e.g., 320-2 of FIGS. 6A and 6B), and '6' may indicate a channel bandwidth of 640 MHz.

The value of the second field BW_EX may be composed of two bits B20 and B21 and may be set to any one of '0', '1', '2', and '3'. For example, when the value of the first field BW is '6', in the second field BW_EX, '0' may indicate a channel bandwidth of 640 MHz with a third arrangement type (e.g., 640-1 of FIGS. 6A and 6B), '1' may indicate a channel bandwidth of 640 MHz with a fourth arrangement type (e.g., 640-2 of FIGS. 6A and 6B), '2' may indicate a channel bandwidth of 640 MHz with a fifth arrangement type (e.g., 640-3 of FIGS. 6A and 6B), and '3' may indicate a channel bandwidth of 640 MHz with a sixth arrangement type (e.g., 640-4 of FIGS. 6A and 6B).

When the value of the first field BW is not set to '6', the second field BW_EX may be in a reserved state. In an embodiment, a station may determine whether to extract the second field BW_EX, based on the value of the first field BW, and may selectively extract the second field BW_EX based on a result of the determining. For example, when the value of the first field BW is '0', '1', '2', '3', '4', or '5', the station may skip extraction of the second field BW_EX for identifying a channel frequency. Alternatively or additionally, when the value of the first field BW is '6', the station may extract the second field BW_EX for identifying a channel frequency.

In an embodiment, when a channel bandwidth used by an access point for communication is determined to be 640 MHz-1, the station may extract the first field BW from U-SIG-1 to identify that the value of the first field BW is '6' and may extract the second field BW_EX from U-SIG-1 to identify that the value of the second field BW_EX is '0', thereby identifying the determined channel bandwidth as 640 MHz-1.

Referring to FIG. 7B, the value of the first field BW may be composed of three bits B3 to B5 in U-SIG-1 and may be set to any one of '0', '1', '2', '3', '4', '5', '6', and '7'. For example, in the first field BW, '0' may indicate a channel bandwidth of 20 MHz, '1' may indicate a channel bandwidth of 40 MHz, '2' may indicate a channel bandwidth of 80 MHz, '3' may indicate a channel bandwidth of 160 MHz, '4' may indicate a channel bandwidth of 320 MHz with a first arrangement type (e.g., 320-1 of FIGS. 6A and 6B), '5' may indicate a channel bandwidth of 320 MHz with a second arrangement type (e.g., 320-2 of FIGS. 6A and 6B), '6' may indicate a channel bandwidth of 640 MHz with a third or a fourth arrangement type (e.g., 640-1 or 640-2 of FIGS. 6A and 6B, respectively), and '7' may indicate a channel bandwidth of 640 MHz with a fifth or a sixth arrangement type (e.g., 640-3 or 640-4 of FIGS. 6A and 6B, respectively).

The value of the second field BW_EX may be composed of one bit of B20 and may be set to any one of '0' and '1'. For example, when the value of the first field BW is '6', in the second field BW_EX, '0' may indicate a channel bandwidth of 640 MHz with a third arrangement type (e.g., 640-1 of FIGS. 6A and 6B), and '1' may indicate a channel bandwidth of 640 MHz with a fourth arrangement type (e.g., 640-2 of FIGS. 6A and 6B). Alternatively or additionally, when the value of the first field BW is '7', in the second field BW_EX, '0' may indicate a channel bandwidth of 640 MHz with a fifth arrangement type (e.g., 640-3 of FIGS. 6A and 6B), and '1' may indicate a channel bandwidth of 640 MHz with a fifth arrangement type (e.g., 640-4 of FIGS. 6A and 6B).

When the value of the first field BW is set to '0', '1', '2', '3', '4', or '5', the second field BW_EX may be in a 'reserved' state. In an embodiment, when the value of the first field BW is 0', '1', '2', '3', '4', or '5', the station may skip extraction of the second field BW_EX for identifying a channel frequency.

For example, when the channel bandwidth used by the access point for communication is determined to be 640 MHz-1, the station may extract the first field BW from U-SIG-1 to identify that the value of the first field BW is '6' and may extract the second field BW_EX from U-SIG-1 to identify that the value of the second field BW_EX is '0', thereby identifying the determined channel bandwidth as 640 MHz-1.

For another example, when the channel bandwidth used by the access point for communication is determined to be 640 MHz-3, the station may extract the first field BW from U-SIG-1 to identify that the value of the first field BW is '7' and may extract the second field BW_EX from U-SIG-1 to identify that the value of the second field BW_EX is '0', thereby identifying the determined channel bandwidth as 640 MHz-3.

Referring to FIG. 7C, the value of the first field BW may be composed of three bits B3 to B5 in U-SIG-1 and may be set to any one of '0', '1', '2', '3', '4', and '5'. For example, in the first field BW, '0' may indicate a channel bandwidth of 20 MHz, '1' may indicate a channel bandwidth of 40 MHz, '2' may indicate a channel bandwidth of 80 MHz, '3' may indicate a channel bandwidth of 160 MHz, '4' may indicate a channel bandwidth of 320 MHz, and '5' may indicate a channel bandwidth of 640 MHz.

The value of the second field BW_EX may be composed of two bits B20 and B21 and may be set to any one of '0', '1', '2', and '3'. For example, when the value of the first field BW is '4', in the second field BW_EX, '0' may indicate a channel bandwidth of 320 MHz with a first arrangement type (e.g., 320-1 of FIGS. 6A and 6B) and '1' may indicate a channel bandwidth of 320 MHz with a second arrangement type (e.g., 320-2 of FIGS. 6A and 6B). Alternatively or additionally, when the value of the first field BW is '5', in the second field BW_EX, '0' may indicate a channel bandwidth of 640 MHz with a third arrangement type (e.g., 640-1 of FIGS. 6A and 6B), '1' may indicate a channel bandwidth of 640 MHz with a fourth arrangement type (e.g., 640-2 of FIGS. 6A and 6B), '2' may indicate a channel bandwidth of 640 MHz with a fifth arrangement type (e.g., 640-3 of FIGS. 6A and 6B), and '3' may indicate a channel bandwidth of 640 MHz with a sixth arrangement type (e.g., 640-4 of FIGS. 6A and 6B).

When the value of the first field BW is not set to '4' or '5', the second field BW_EX may be in the 'reserved' state. In an embodiment, when the value of the first field BW is 0', '1', '2', or '3', the station may skip extraction of the second field BW_EX for identifying a channel frequency.

For example, when the channel bandwidth used by the access point for communication is determined to be 320 MHz-1, the station may extract the first field BW from U-SIG-1 to identify that the value of the first field BW is '4' and may extract the second field BW_EX from U-SIG-1 to identify that the value of the second field BW_EX is '0', thereby identifying the determined channel bandwidth as 320 MHz-1.

For another example, when the channel bandwidth used by the access point for communication is determined to be 640 MHz-1, the station may extract the first field BW from U-SIG-1 to identify that the value of the first field BW is '5' and may extract the second field BW_EX from U-SIG-1 to identify that the value of the second field BW_EX is '0', thereby identifying the determined channel bandwidth as 640 MHz-1.

Figure 8:
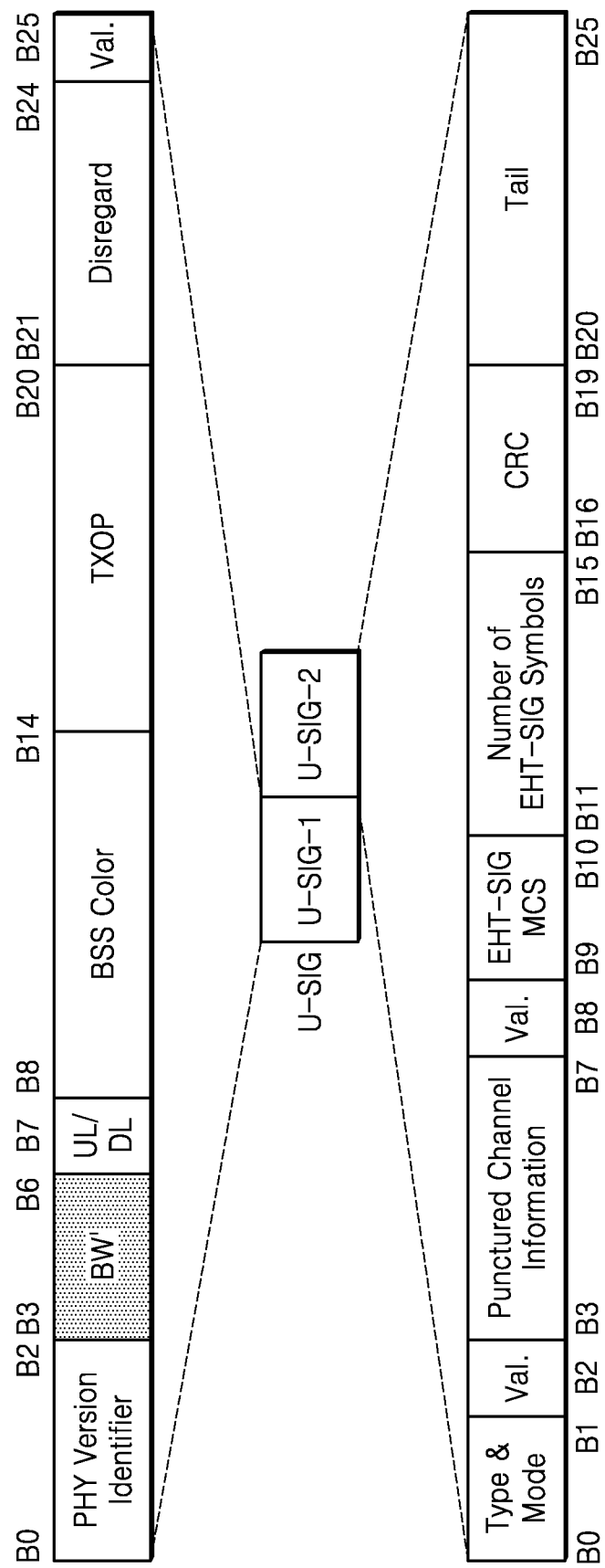
FIG. 8 is a diagram illustrating a U-SIG field, according to an embodiment.

FIG. 8 is a diagram illustrating a U-SIG field, according to an embodiment. The U-SIG field of FIG. 8 may include or may be similar in many respects to the U-SIG field described above with reference to FIG. 5, and may include additional features not mentioned above. Hereinafter, descriptions previously given with reference to FIG. 5 may be omitted.

Referring to FIG. 8, the U-SIG field may include U-SIG-1 and U-SIG-2. As shown in FIG. 8, U-SIG-1 may be composed of bits B0 to B25, and U-SIG-2 may be composed of another bits B0 to B25. That is, U-SIG-1 may have a length of 26 bits and U-SIG-2 may have a length of 26 bits. U-SIG-1 may include an extended first field BW' for indicating a channel bandwidth determined for communication, and the extended first field BW' may be composed of four bits B3 to B6. Details on the extended first field BW' are described below with reference to FIG. 9.

Although FIG. 8 illustrates an embodiment in which the extended first field BW' has been extended by using one bit of the disregard field, which is a reserved field, this is only an example, and the present disclosure is not limited thereto. For example, the extended first field BW' may be extended by using another reserved field (e.g., the Val. field) of U-SIG-1.

FIG. 9 is a diagram illustrating a method of identifying a channel bandwidth by using U-SIG-1, according to an embodiment.

Referring to FIG. 9, a value of the extended first field BW' may be composed of four bits B3 to B6 in U-SIG-1 and may be set to any one of '0', '1', '2', '3', '4', '5', '6', '7', '8', and '9'. For example, in the extended first field BW', '0' may indicate a channel bandwidth of 20 MHz, '1' may indicate a channel bandwidth of 40 MHz, '2' may indicate a channel bandwidth of 80 MHz, '3' may indicate a channel bandwidth of 160 MHz, '4' may indicate a channel bandwidth of 320 MHz with a first arrangement type (e.g., 320-1 of FIGS. 6A and 6B), '5' may indicate a channel bandwidth of 320 MHz with a second arrangement type (e.g., 320-2 of FIGS. 6A and 6B), '6' may indicate a channel bandwidth of 640 MHz with a third arrangement type (e.g., 640-1 of FIGS. 6A and 6B), '7' may indicate a channel bandwidth of 640 MHz with a fourth arrangement type (e.g., 640-2 of FIGS. 6A and 6B), '8' may indicate a channel bandwidth of 640 MHz with a fifth arrangement type (e.g., 640-3 of FIGS. 6A and 6B), and '9' may indicate a channel bandwidth of 640 MHz with a sixth arrangement type (e.g., 640-4 of FIGS. 6A and 6B).

Figure 10A:
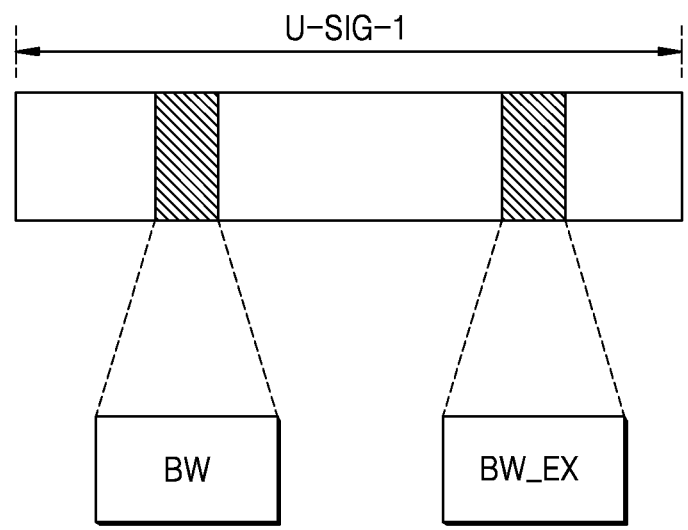
FIGS. 10A, 10B, an 10C are diagrams illustrating examples of U-SIG fields according to an embodiment.
Figure 10B:
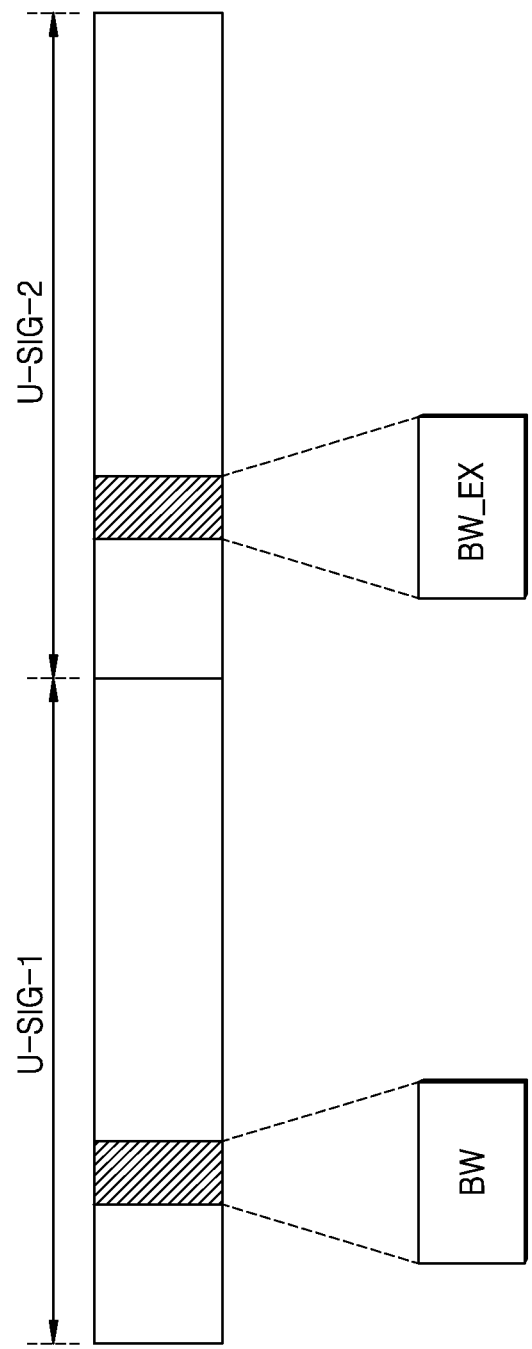
Figure 10C:
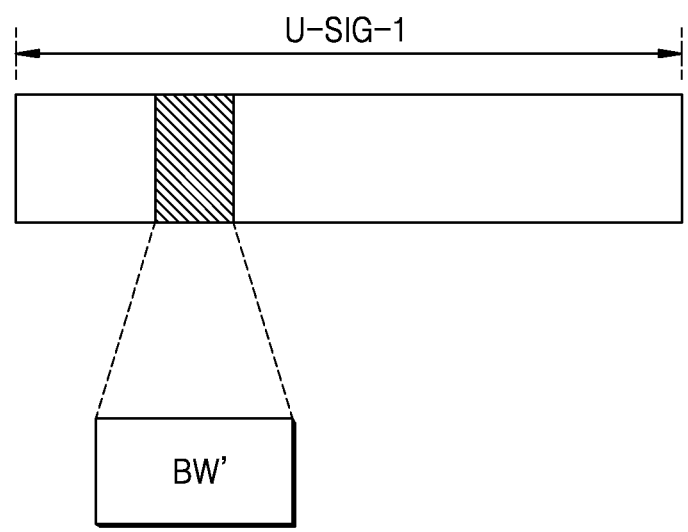

FIGS. 10A to 10C are diagrams illustrating examples of U-SIG fields, according to embodiments.

Referring to FIG. 10A, in some embodiments, the U-SIG-1 field included in the U-SIG field may include the first field BW and the second field BW_EX. For example, the first field BW may indicate that a channel bandwidth determined for communication is 640 MHz and the second field BW_EX may indicate an arrangement type of the channel bandwidth of 640 MHz. For another example, a combination of values of the first field BW and the second field BW_EX may indicate the channel bandwidth of 640 MHz and the arrangement type thereof.

In an embodiment, the first field BW and the second field BW_EX may be arranged apart from each other in U-SIG-1. In some embodiments, the first field BW and the second field BW_EX may be continuously arranged in U-SIG-1.

In an embodiment, the first field BW may have a bit length greater than that of the second field BW_EX. In some embodiments, the first field BW may have the same bit length as that of the second field BW_EX. In some optional or additional embodiments, the first field BW may have a shorter (e.g. less) bit length than that of the second field BW_EX.

Referring to FIG. 10B, in some embodiments, the U-SIG-1 field included in the U-SIG field may include the first field BW and the U-SIG-2 field included in the U-SIG field may include the second field BW_EX. For example, the first field BW of U-SIG-1 may indicate that the channel bandwidth determined for communication is 640 MHz and the second field BW_EX of U-SIG-2 may indicate an arrangement type of the channel bandwidth of 640 MHz. For another example, a combination of values of the first field BW of U-SIG-1 and the second field BW_EX of U-SIG-2 may indicate the channel bandwidth of 640 MHz and the arrangement type thereof.

Referring to FIG. 10C, in some embodiments, the U-SIG-1 field included in the U-SIG field may include the extended first field BW'. For example, the extended first field BW' may indicate that the channel bandwidth determined for communication is 640 MHz and indicate an arrangement type of the channel bandwidth of 640 MHz.

Figure 11:
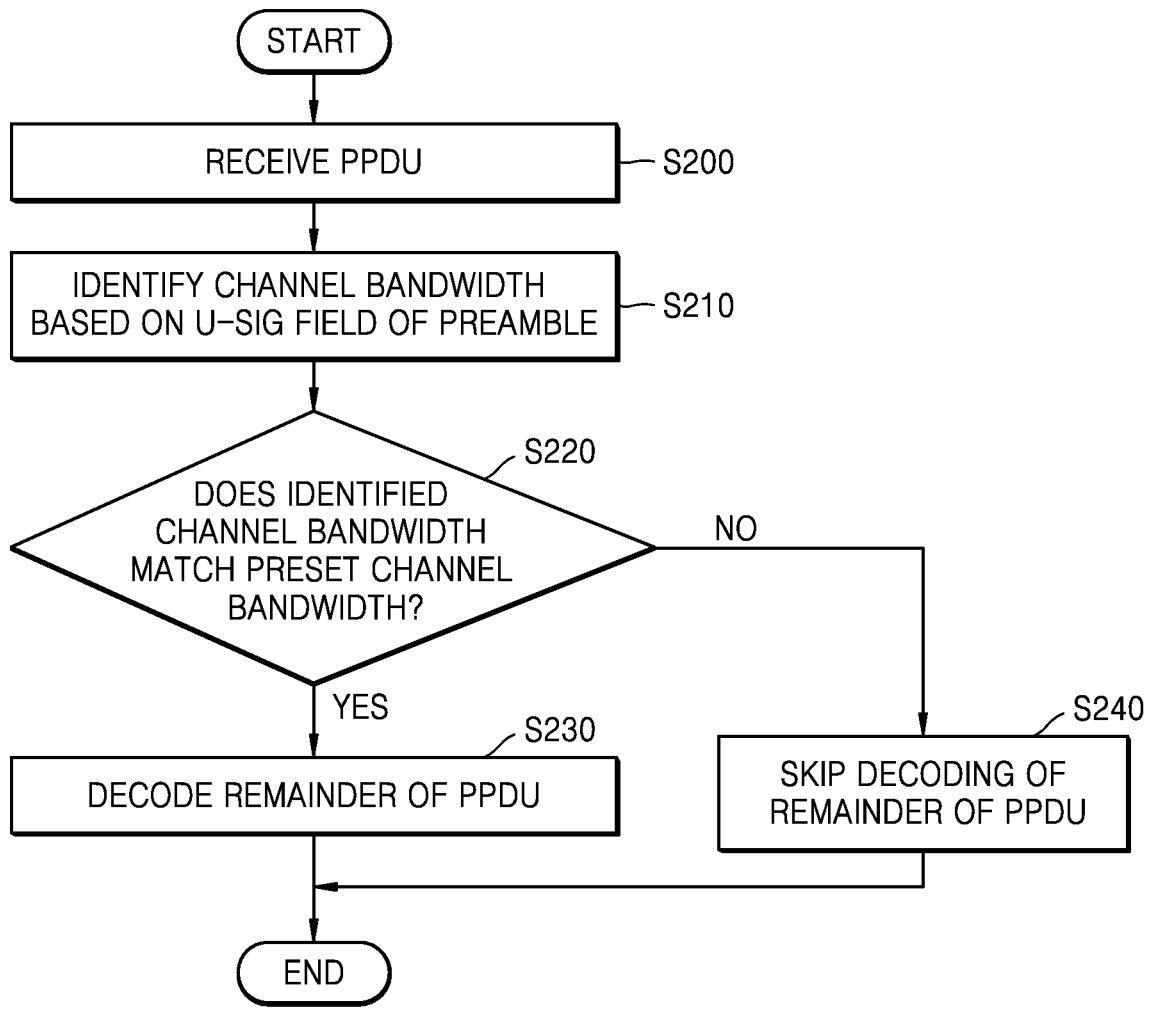
FIG. 11 is a flowchart illustrating an operating method of a first device according to an embodiment.

FIG. 11 is a flowchart illustrating an operating method of a first device according to an embodiment. As described herein, the first device may be a station.

Referring to FIG. 11, in operation S200, the first device may receive a PPDU from a second device, which may be an access point.

In operation S210, the first device may identify a channel bandwidth based on a U-SIG field of a preamble of the PPDU. In an embodiment, the first device may decode the preamble of the PPDU and identify, based on a result of the decoding, a channel bandwidth through which the PPDU may have been transmitted. For example, the first device may extract at least one of a first field and a second field of the U-SIG field and identify, based on at least one of a value of the first field and a value of the second field, the channel bandwidth through which the PPDU has been transmitted.

In operation S220, the first device may determine whether the channel bandwidth identified in operation S210 matches a preset channel bandwidth. When the first device and the second device establish a connection, the second device may inform the first device of the preset channel bandwidth for communication in advance. The first device may determine whether the identified channel bandwidth matches the preset channel bandwidth to identify whether the PPDU is a PPDU transmitted (or allocated) to the first device.

When the answer is 'YES' in operation S220, in operation S230, the first device may decode the remainder of PPDU except for a portion thereof (e.g., the preamble) decoded in operation S210. That is, when the identified channel bandwidth matches the preset channel bandwidth, the first device may identify that the PPDU is a PPDU transmitted (or allocated) to the first device and obtain data by decoding a payload of the PPDU.

When the answer is 'NO' in operation S220, the first device may skip decoding of the remainder of the PPDU in operation S240. That is, when the identified channel bandwidth does not match the preset channel bandwidth, the first device may identify that the PPDU is not a PPDU transmitted to the first device and skip decoding of the remainder of the PPDU. In addition, the first device may delete the PPDU.

Figure 12:
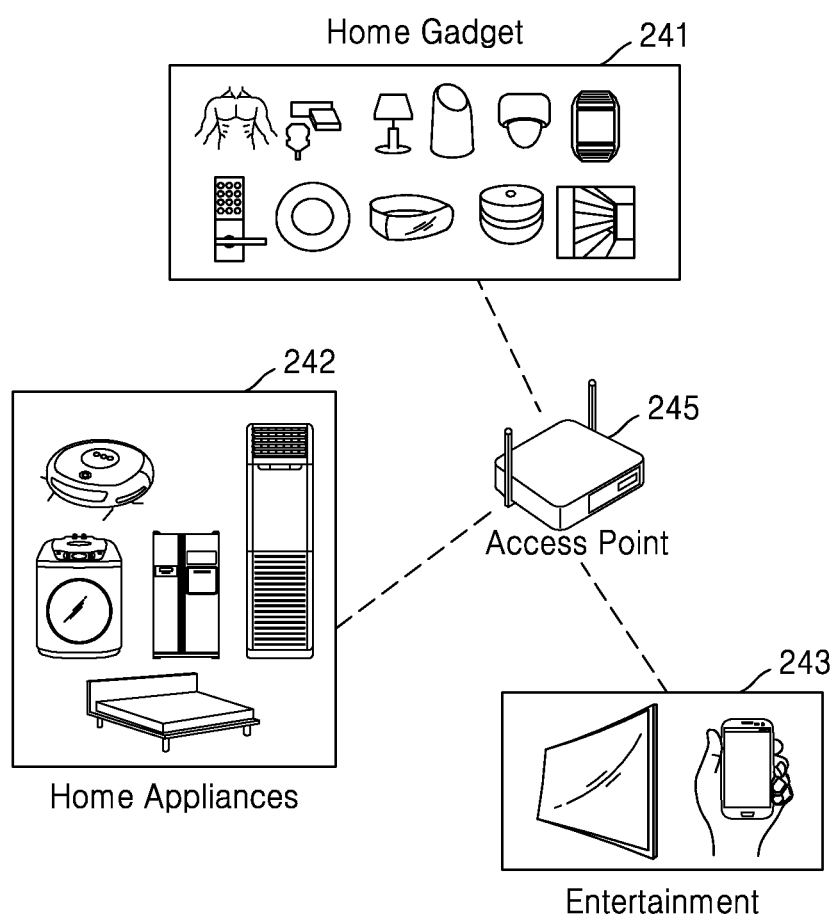
FIG. 12 is a diagram illustrating examples of a device for wireless communication, according to an embodiment.

FIG. 12 is a diagram illustrating examples of devices for wireless communication, according to an embodiment. Referring to FIG. 12, an IoT network system, is illustrated, that includes home gadgets 241, home appliances 242, entertainment devices 243, and an access point 245.

In some embodiments, the devices for wireless communication of FIG. 12, as described above with reference to FIGS. 1 to 11, may transmit and/or receive a PPDU including a first field and a second field capable of indicating a channel bandwidth of 640 MHz and an arrangement type thereof such that a channel bandwidth up to 640 MHz may be supported. Consequently, information on a channel frequency through which the PPDU is transmitted may be accurately delivered. Accordingly, communication through various channel bandwidths including 640 MHz may be effectively supported in the IoT network of FIG. 12.

While the present disclosure has been particularly shown and described with reference to embodiments thereof, it may be understood that various changes in form and details may be made therein without departing from the spirit and scope of the following claims.

What is claimed is:

1. A wireless communication method of a first device, the wireless communication method comprising:
receiving a physical layer protocol data unit (PPDU) from a second device;
identifying a channel bandwidth of the PPDU based on a first field and a second field related to the channel bandwidth of the PPDU, the first field and the second field being extracted from a signal field included in the PPDU;
determining whether the channel bandwidth of the PPDU matches a preset channel bandwidth; and
performing, based on a result of the determining, decoding on the PPDU.

2. The wireless communication method of claim 1, wherein the channel bandwidth of the PPDU is at least one of 20 megahertz (MHz), 40 MHz, 80 MHz, 160 MHz, 320 MHz, and 640 MHz.

3. The wireless communication method of claim 1, wherein the identifying of the channel bandwidth of the PPDU comprises:
identifying, based on the first field, that the channel bandwidth of the PPDU is 640 MHz; and
identifying, based on the second field, an arrangement type of the channel bandwidth of the PPDU.

4. The wireless communication method of claim 3, wherein a number of first bits included in the first field is three,
a first value of the first bits indicates that the channel bandwidth of the PPDU is 20 MHZ,
a second value of the first bits indicates that the channel bandwidth of the PPDU is 40 MHZ,
a third value of the first bits indicates that the channel bandwidth of the PPDU is 80 MHZ,
a fourth value of the first bits indicates that the channel bandwidth of the PPDU is 160 MHZ,
a fifth value of the first bits indicates that the channel bandwidth of the PPDU is 320 MHZ having a first arrangement type,
a sixth value of the first bits indicates that the channel bandwidth of the PPDU is 320 MHz having a second arrangement type,
a seventh value of the first bits indicates that the channel bandwidth of the PPDU is 640 MHZ,
the second field comprises two second bits,
a first value of the second bits indicates that the channel bandwidth of the PPDU has a third arrangement type,
a second value of the second bits indicates that the channel bandwidth of the PPDU has a fourth arrangement type,
a third value of the second bits indicates that the channel bandwidth of the PPDU has a fifth arrangement type, and
a fourth value of the second bits indicates that the channel bandwidth of the PPDU has a sixth arrangement type.

5. The wireless communication method of claim 1, wherein the identifying of the channel bandwidth of the PPDU comprises:
identifying, based on the first field, that the channel bandwidth of the PPDU is 640 MHZ; and
based on a combination of the first field and the second field, identifying an arrangement type of the channel bandwidth of the PPDU.

6. The wireless communication method of claim 5, wherein:
the first field comprises three first bits,
a first value of the first bits indicates that the channel bandwidth of the PPDU is 20 MHz,
a second value of the first bits indicates that the channel bandwidth of the PPDU is 40 MHz,
a third value of the first bits indicates that the channel bandwidth of the PPDU is 80 MHZ,
a fourth value of the first bits indicates that the channel bandwidth of the PPDU is 160 MHZ,
a fifth value of the first bits indicates that the channel bandwidth of the PPDU is 320 MHz having a first arrangement type,
a sixth value of the first bits indicates that the channel bandwidth of the PPDU is 320 MHz having a second arrangement type,
a seventh value of the first bits indicates that the channel bandwidth of the PPDU is 640 MHz having a third arrangement type or a fourth arrangement type,
an eighth value of the first bits indicates that the channel bandwidth of the PPDU is 640 MHz having a fifth arrangement type or a sixth arrangement type,
the second field comprises a second bit,
when the first bits match the seventh value, a first value of the second bit indicates that the channel bandwidth of the PPDU has the third arrangement type, and a second value of the second bit indicates that the channel bandwidth of the PPDU has the fourth arrangement type, and
when the first bits match the eighth value, the first value of the second bit indicates that the channel bandwidth of the PPDU has the fifth arrangement type, and the second value of the second bit indicates that the channel bandwidth of the PPDU has the sixth arrangement type.

7. The wireless communication method of claim 1, wherein, the identifying of the channel bandwidth of the PPDU comprises:
identifying, based on a first value of the first field, that the channel bandwidth of the PPDU is one of 320 megahertz (MHz) and 640 MHz; and
based on a combination of the first value of the first field and a second value of the second field, identifying an arrangement type of the channel bandwidth of the PPDU.

8. The wireless communication method of claim 7, wherein a number of first bits included in the first field is three,
a first value of the first bits indicates that the channel bandwidth of the PPDU is 20 MHZ,
a second value of the first bits indicates that the channel bandwidth of the PPDU is 40 MHz,
a third value of the first bits indicates that the channel bandwidth of the PPDU is 80 MHZ,
a fourth value of the first bits indicates that the channel bandwidth of the PPDU is 160 MHZ,
a fifth value of the first bits indicates that the channel bandwidth of the PPDU is 320 MHZ,
a sixth value of the first bits indicates that the channel bandwidth of the PPDU is 640 MHZ,
the second field comprises two second bits,
when the first bits match the fifth value, a first value of the second bits indicates that the channel bandwidth of the PPDU has a first arrangement type, and a second value of the second bits indicates that the channel bandwidth of the PPDU has a second arrangement type, and
when the first bits match the sixth value, the first value of the second bits indicates that the channel bandwidth of the PPDU has a third arrangement type, the second value of the second bits indicates that the channel bandwidth of the PPDU has a fourth arrangement type, a third value of the second bits indicates that the channel bandwidth of the PPDU has a fifth arrangement type, and a fourth value of the second bits indicates that the channel bandwidth of the PPDU has a sixth arrangement type.

9. The wireless communication method of claim 1, wherein a first bit length of the first field is greater than a second bit length of the second field.

10. The wireless communication method of claim 1, wherein the signal field further comprises at least one field arranged between the first field and the second field.

11. The wireless communication method of claim 1, wherein the performing of the decoding on the PPDU comprises:
based on the result of the determining indicating that the channel bandwidth of the PPDU does not match the preset channel bandwidth, skipping decoding of a payload of the PPDU.

12. The wireless communication method of claim 1, wherein the identifying of the channel bandwidth of the PPDU comprises:
extracting the first field from the signal field;
determining, based on a value of the first field, whether to extract the second field; and
selectively extracting, based on a result of the determining, the second field from the signal field.

13. A wireless communication method of a first device, the wireless communication method comprising:
receiving a physical layer protocol data unit (PPDU) from a second device;
extracting, from a signal field comprised by the PPDU, an extended field related to a channel bandwidth of the PPDU;
identifying, based on a value of the extended field, whether the channel bandwidth of the PPDU is one of 20 MHz, 40 MHZ, 80 MHz, 160 MHz, 320 MHz, and 640 MHz;
determining whether the channel bandwidth matches a preset channel bandwidth; and
performing, based on a result of the determining, decoding on the PPDU.

14. The wireless communication method of claim 13, wherein a number of field bits included in the extended field is four,
a first value of the field bits indicates that the channel bandwidth of the PPDU is 20 MHZ,
a second value of the field bits indicates that the channel bandwidth of the PPDU is 40 MHz,
a third value of the field bits indicates that the channel bandwidth of the PPDU is 80 MHZ,
a fourth value of the field bits indicates that the channel bandwidth of the PPDU is 160 MHz,
a fifth value of the field bits indicates that the channel bandwidth of the PPDU is 320 MHz having a first arrangement type,
a sixth value of the field bits indicates that the channel bandwidth of the PPDU is 320 MHz having a second arrangement type,
a seventh value of the field bits indicates that the channel bandwidth of the PPDU is 640 MHz having a third arrangement type, an eighth value of the field bits indicates that the channel bandwidth of the PPDU is 640 MHz having a fourth arrangement type, a ninth value of the field bits indicates that the channel bandwidth of the PPDU is 640 MHz having a fifth arrangement type, and a tenth value of the field bits indicates that the channel bandwidth of the PPDU is 640 MHZ having a sixth arrangement type.

15. A wireless communication method of a second device for communicating with a first device, the wireless communication method comprising:

determining a channel bandwidth for transmitting a physical layer protocol data unit (PPDU) to the first device;

generating a first field and a second field indicating the channel bandwidth;

generating the PPDU comprising the first field and the second field and conforming to the channel bandwidth; and transmitting the PPDU to the first device, wherein, based on determining the channel bandwidth as 640 MHZ, the generating of the field and the second field comprises:

setting a first value of the first field to indicate that the channel bandwidth is 640 MHz; and setting a second value of the second field to indicate an arrangement type of the channel bandwidth.

16. The wireless communication method of claim 15, wherein the determining of the channel bandwidth comprises:

determining the channel bandwidth as one of 20 MHz, 40 MHz, 80 MHz, 160 MHz, 320 MHz, and 640 MHz.

17. The wireless communication method of claim 16, wherein the determining the channel bandwidth further comprises:

based on the channel bandwidth being determined as 640 MHZ, assigning channel bandwidths of 320 MHz that are arranged adjacent to each other on a frequency axis to form the channel bandwidth.

18. The wireless communication method of claim 15, wherein the determining the channel bandwidth comprises determining the channel bandwidth as 640 MHZ, and the generating the first field and the second field comprises setting a first value of the first field and a second value of the second field to have a combined value indicating that the channel bandwidth is 640 MHz and indicating the arrangement type of the channel bandwidth.

* * * * *